US011235853B2

(12) United States Patent
Pelletier et al.

(10) Patent No.: US 11,235,853 B2
(45) Date of Patent: Feb. 1, 2022

(54) AIRCRAFT WINDOWED STRUCTURE

(71) Applicant: Textron Innovations Inc., Providence, RI (US)

(72) Inventors: Pier-Alexandre Pelletier, St-Colomban (CA); Guillaume Noiseux-Boucher, Mirabel (CA); Sebastien Duval, Terrebonne (CA)

(73) Assignee: Textron Innovations Inc., Providence, RI (US)

( * ) Notice: Subject to any disclaimer, the term of this patent is extended or adjusted under 35 U.S.C. 154(b) by 566 days.

(21) Appl. No.: 16/161,921

(22) Filed: Oct. 16, 2018

(65) Prior Publication Data

US 2020/0115027 A1    Apr. 16, 2020

(51) Int. Cl.
*B64C 1/14* (2006.01)
*B64C 27/06* (2006.01)

(52) U.S. Cl.
CPC .......... *B64C 1/1423* (2013.01); *B64C 1/1492* (2013.01); *B64C 27/06* (2013.01)

(58) Field of Classification Search
CPC ... B64C 1/1423; B64C 1/1461; B64C 1/1492; B60J 5/0402; B60J 5/0405; B60J 5/0408
See application file for complete search history.

(56) References Cited

U.S. PATENT DOCUMENTS

| 4,220,298 | A | * | 9/1980 | Willis | ................... | B64C 1/1476 |
| | | | | | | 244/129.5 |
| 4,483,100 | A | * | 11/1984 | Blankenburg | ........ | E05F 11/426 |
| | | | | | | 49/352 |
| 4,773,700 | A | | 9/1988 | Sannomiya | | |
| 5,154,028 | A | * | 10/1992 | Hill | ........................ | B60J 10/248 |
| | | | | | | 296/201 |
| 5,373,654 | A | * | 12/1994 | Whalen | .................... | A47G 1/06 |
| | | | | | | 40/716 |
| 5,638,648 | A | | 6/1997 | Rotondo | | |
| 6,619,590 | B2 | | 9/2003 | Wojatschek et al. | | |
| 6,868,648 | B2 | | 3/2005 | Glover et al. | | |
| 7,028,950 | B2 | * | 4/2006 | Salmon | ................. | B64C 1/1492 |
| | | | | | | 244/129.3 |
| 7,086,693 | B1 | | 8/2006 | Huisman | | |
| 8,561,354 | B2 | * | 10/2013 | Grudzinski | .............. | B60J 10/79 |
| | | | | | | 49/502 |

(Continued)

OTHER PUBLICATIONS

Canadian Examination Report; Application No. 3,021,478; CIPO; dated Nov. 15, 2019.

*Primary Examiner* — Philip J Bonzell
*Assistant Examiner* — Michael B. Kreiner
(74) *Attorney, Agent, or Firm* — Lawrence Youst PLLC (57) ABSTRACT

A windowed structure includes a body having a frame with an outer wall extending between a first end and a second end. An inner wall extends from the outer wall. The inner wall is connected to the outer wall at the first end to define a proximal joint of the body delimiting a window opening extending through the body. A window element covers the window opening and defines an outer window surface and an inner window surface. The window element has an overlap segment overlaying the outer wall and attached thereto. An unobstructed portion of the window element is defined between the overlap segment and is unobstructed by the frame between the proximal joint.

20 Claims, 5 Drawing Sheets

(56) References Cited

U.S. PATENT DOCUMENTS

| | | | | |
|---|---|---|---|---|
| 8,572,898 | B2* | 11/2013 | Grudzinski | B60J 10/7775 |
| | | | | 49/502 |
| 8,646,215 | B2* | 2/2014 | Grudzinski | B60J 10/79 |
| | | | | 49/502 |
| 8,650,802 | B2* | 2/2014 | Grudzinski | B60J 10/79 |
| | | | | 49/502 |
| 8,714,486 | B2* | 5/2014 | Ainsworth | B29C 70/34 |
| | | | | 244/129.3 |
| 9,279,234 | B1* | 3/2016 | Gielda | B60J 5/0408 |
| 10,689,090 | B2* | 6/2020 | Perez | B64C 1/1407 |
| 10,875,622 | B2* | 12/2020 | Lavallee | B64C 1/143 |
| 2008/0191095 | A1* | 8/2008 | Bold | B64C 1/1492 |
| | | | | 244/129.3 |
| 2016/0031562 | A1 | 2/2016 | Mores et al. | |
| 2019/0210708 | A1* | 7/2019 | Gorgoglione | B64C 27/04 |

\* cited by examiner

FIG. 6E

AIRCRAFT WINDOWED STRUCTURE

TECHNICAL FIELD

The application relates generally to structures, more particularly, to structures with windows.

BACKGROUND

Door transparencies (e.g. windows) are conventionally installed using a retainer to attach the window to the frame of the structure, such as a door. The retainer is often not perfectly flush with the surrounding door structure and is fastened using protruding screws which is not ideal. The retainer sometimes also reduces the visible area or field of view of the window, and is also not aesthetic pleasing. Additional sealing may also be applied to protect the joint against water infiltration.

SUMMARY

In one aspect, there is provided an aircraft, comprising a fuselage defining an outer surface and an inner surface, the fuselage having a door opening extending therethrough and providing access to an interior of the fuselage; and a door mounted to the fuselage about the door opening and displaceable between an open position and a closed position, the door having a door frame with an outer wall extending between a window end and a fuselage end, and an inner wall extending from the outer wall inwardly toward the interior of the fuselage, the inner wall connected to the outer wall at the window end to define a proximal joint of the door frame delimiting a window opening extending through the door, the door having a window element covering the window opening and defining an outer window surface and an inner window surface, the window element having an overlap segment overlaying the outer wall and being attached thereto, an unobstructed portion of the window element defined between the overlap segment and being unobstructed by the door frame between the proximal joint.

In another aspect, there is provided a windowed structure, comprising: a body having a frame with an outer wall extending between a first end and a second end, and an inner wall extending from the outer wall, the inner wall connected to the outer wall at the first end to define a proximal joint of the body delimiting a window opening extending through the body; and a window element covering the window opening and defining an outer window surface and an inner window surface, the window element having an overlap segment overlaying the outer wall and being attached thereto, an unobstructed portion of the window element defined between the overlap segment and being unobstructed by the frame between the proximal joint.

In a further aspect, there is provided a method of manufacturing a windowed structure, the method comprising: providing a frame of the windowed structure with an outer wall having a proximal joint delimiting a window opening through the windowed structure; and attaching a window element to the frame to cover the window opening such that a segment of the window element overlays the outer wall of the frame, a portion of the window element defined between the segment being unobstructed between the proximal joint of the frame.

DESCRIPTION OF THE DRAWINGS

Reference is now made to the accompanying figures in which.

DETAILED DESCRIPTION

Figure 1A:
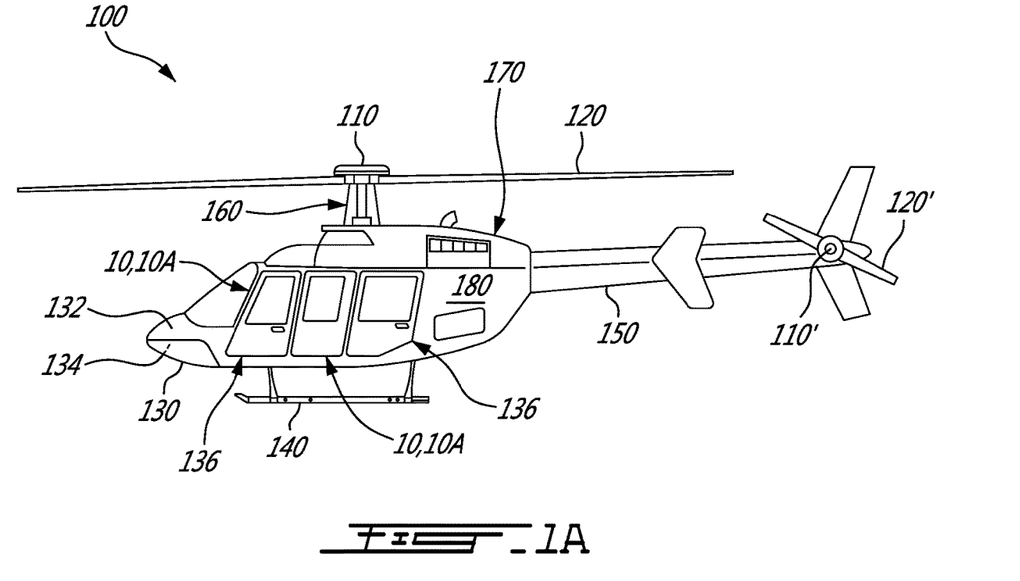
FIG. 1A is a schematic side view of a rotorcraft in accordance with an embodiment of the present disclosure.

FIG. 1A shows an aircraft. The aircraft shown in FIG. 1A is a rotorcraft 100 according to one example embodiment of the aircraft. Rotorcraft 100 features a rotor system 110, blades 120, a fuselage 130 defining a cabin 180, a landing gear 140, and an empennage 150. Rotor system 110 rotates blades 120. Rotor system 110 includes a control system for selectively controlling the pitch of each blade 120 in order to selectively control direction, thrust, and lift of rotorcraft 100. Fuselage 130 represents the body of rotorcraft 100 and is coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120.

The fuselage 130 defines an outer surface 132 and an inner surface 134. The outer surface 132 is exposed and visible, and forms the outer surface of the body of the rotorcraft 100. The inner surface 134 faces toward the interior of the rotorcraft 100. The fuselage 130 has multiple door openings 136 which extend through the fuselage 130 between the inner and outer surfaces 132,134. The door openings 136 provide access to the interior of the fuselage 130, to the interior of the cabin 180 for example. Each door opening 136 is covered by a windowed structure 10. Each windowed structure 10 is a body which has a window or transparency to admit light. The windowed structures 10 in the depicted embodiment are doors 10A, which are mounted to the fuselage 130 about the door openings 136 to cover the door openings 136, and to expose them. The doors 10A shown in FIG. 1A are passenger doors which open and close to allow passengers to enter and exit the cabin 180 of the rotorcraft 100. Other windowed structures 10 are within the scope of the present disclosure. For example, in an alternate embodiment, the windowed structure 10 is a cargo door with at least part of the cargo door capable of admitting light therethrough. In another alternate embodiment, the windowed structure 10 is a panel with at least part of the panel capable of admitting light therethrough. In another embodiment, the windowed structure 10 is a windshield. Therefore, reference to doors 10A herein does not limit the windowed structure 10 to being only a door.

Figure 1B:
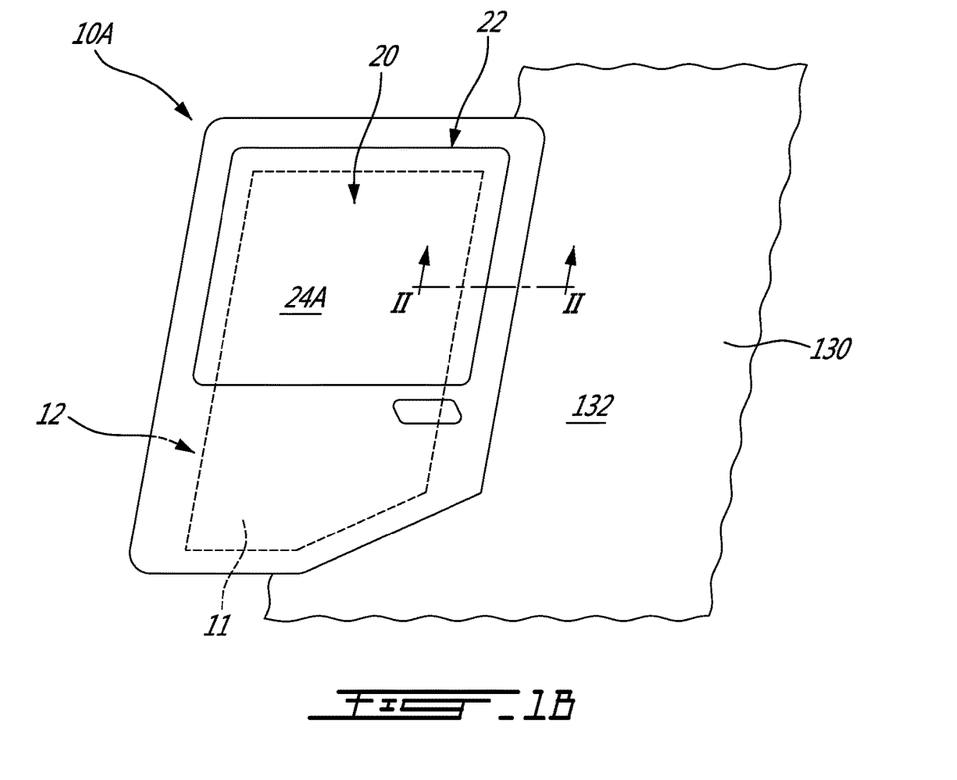
FIG. 1B is a schematic side view of a door and a window element of the rotorcraft shown in FIG. 1A.

Referring to FIGS. 1A and 1B, each door 10A is any suitable movable part or barrier which is mounted to the fuselage 130 about one of the door openings 136 using any suitable structure such as hinges. Each door 10A is displaceable between an open position to provide access to the interior of the fuselage 130 via the door opening 136, and a closed position (shown in FIG. 1A) to block the door opening 136 and prevent access therethrough. The door 10A has a door body 11, and a door frame 12. The door frame 12 in the depicted embodiment extends along all of the periphery of the door body 11. In an alternate embodiment, the door frame 12 extends along less than all of the periphery of the door body 11. The door 10A has a window element 20 which allows light to be admitted through the door 10A. The window element 20 is any suitable transparency or other body to achieve this purpose. The window element 20 may have any suitable shape or size, and may be made from any suitable material such as a polymer and glass. In the depicted embodiment, the window element 20 is a single layer of glass. Other configurations for the window element 20 are also possible. The window element 20 covers or occupies a window opening 22 which extends through the door body 11. The window element 20 has an outer window surface 24A which forms the external surface of the window element 20, and an inner window surface 24B (see FIG. 2).

Figure 2:
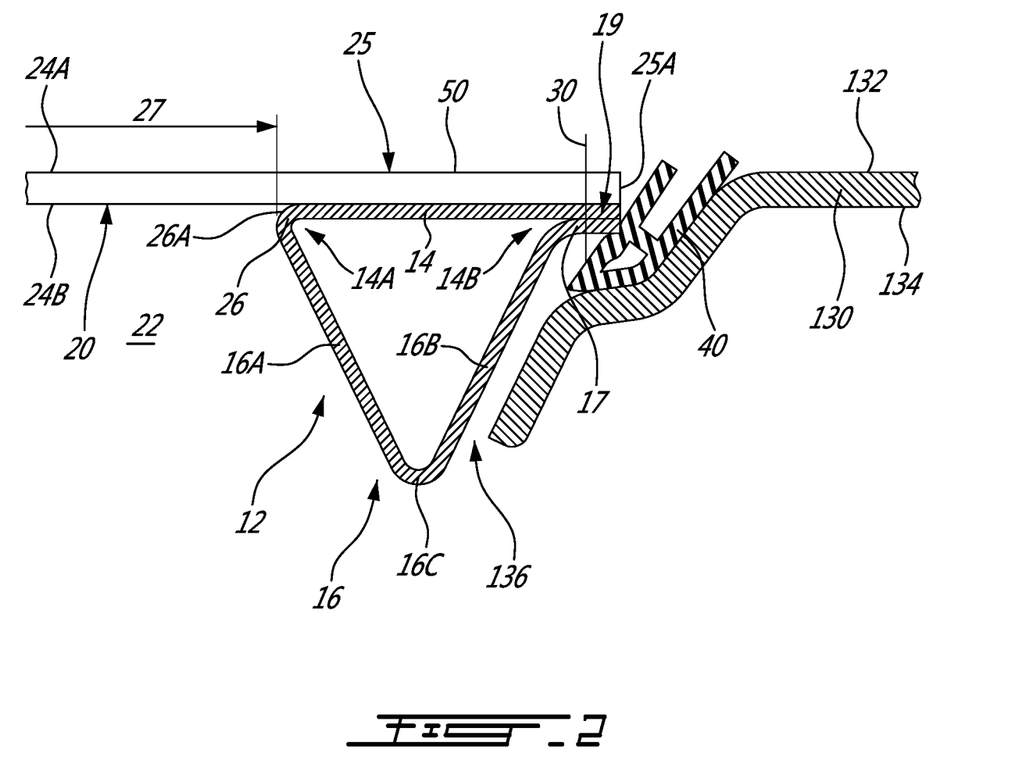
FIG. 2 is a cross-sectional view of a frame of the door and the window element of FIG. 1B, taken along the line II-II in FIG. 1B.

FIG. 2 shows the door frame 12 and window element 20 in cross-section and according to one embodiment of the present disclosure. The door frame 12 is a portion of the door 10A that provides structure thereto. The door frame 12 includes an outer wall 14. The outer wall 14 is the segment of the door frame 12 closest to the outer surface 132 of the fuselage 130. In the depicted embodiment, the outer wall 14 is an outermost wall of the door frame 12. The outer wall 14 extends between a first end 14A, sometimes referred to herein as the "window end 14A", and a second end 14B, sometimes referred to herein as the "fuselage end 14B". The window end 14A is the extremity of the outer wall 14 which is closest to a center of the window opening 22, and furthest from the fuselage 130. The fuselage end 14B is the extremity of the outer wall 14 which is closest to the fuselage 130, and furthest from the center of the window opening 22. An inner wall 16 extends from the outer wall 14 inwardly. When the door 10A in the depicted embodiment is in the closed position, the inner wall 16 extends from the outer wall 14 inwardly toward the interior of the fuselage 130. The outer and inner walls 14,16 meet and connect at least at the window end 14A. The meeting or mating of the outer and inner walls 14,16 at the window end 14A forms a proximal joint 26. The proximal joint 26 is the portion of the door frame 12 that is closest to the center of the window element 20. The proximal joint 26 delimits and bounds the window opening 22 extending through the door body 11. In embodiments where the window opening 22 does not span the entire door body 11, the proximal joint 26 may not be present along the entire length of the door frame 12.

In the embodiment of the door frame 12 shown in FIG. 2, the proximal joint 26 is a corner 26A of the door frame 12 formed between the outer wall 14 and the inner wall 16 at the window end 14A. The inner wall 16 of the door frame 12 includes a first segment 16A and a second segment 16B in the depicted embodiment. The first and second segments 16A,16B are connected to each other at a common joint 16C. The first and second segments 16A,16B of the inner wall 16, and the outer wall 14, are interconnected to form a triangular cross-sectional shape of the door frame 12. The first segment 16A of the inner wall 16 extends inwardly from the outer wall 14 at the window end 14A to the common joint 16C. The first segment 16A of the inner wall 16 extends inwardly in a direction toward the fuselage 130 from the outer wall 14 at the window end 14A to the common joint 16C. The first segment 16A intersects the outer wall 14 at the corner 26A. The first segment 16A and the outer wall 14 are integral at the corner 26A. The corner 26A in the depicted embodiment is curved or rounded. The first segment 16A of the inner wall 16 and the outer wall 14 are free of overlap at the corner 26A in the depicted embodiment. The inner wall 16 and the outer wall 14 are free of overlap at the corner 26A in the depicted embodiment. The door frame 12 is free of obstruction in an inward direction from the corner 26A (e.g. from the outer wall 14 toward the interior of the cabin 180). The window element 20 is free of obstruction in an inward direction from the corner 26A (e.g. from the window element 20 toward the interior of the cabin 180). In the embodiment shown in FIG. 2, the inner wall 16 and the outer wall 14 delimit a cavity of the door frame 12, such that the door frame 12 is hollow. In other embodiments, some of which are described below, the cavity of the door frame 12 delimited by the inner wall 16 and the outer wall 14 is at least partially filled.

Still referring to FIG. 2, the window element 20 has an overlap segment 25. The overlap segment 25 is a peripheral portion of the window element 20 that extends over at least part of the length of the outer wall 14 and has a distal extremity at a peripheral window edge 25A. The overlap segment 25 is attached to the outer wall 14 along at least part of its length to thereby attach the window element 20 to the door frame 12. At least some of the inner window surface 24B along the overlap segment 25 abuts against the outer wall 14. The overlap segment 25 is an "obstructed" portion of the window element 20 because at least some of the outer wall 14 is attached to the overlap segment 25 to block or inhibit the passage of light through the overlap segment 25. The overlap segment 25 is spaced more outwardly with respect to the interior of the fuselage 130 than the outer wall 14.

An unobstructed portion 27 of the window element 20 is immediately adjacent to the overlap segment 25. More particularly, the unobstructed portion 27 of the window element 20 is defined between the overlap segment 25. Stated differently, the overlap segment 25 borders and delimits the unobstructed portion 27 of the window element 20. In the depicted embodiment, the unobstructed portion 27 of the window element 20 is all of the window element 20 except for the overlap segment 25. The unobstructed portion 27 of the window element 20 is an area or part of the window element 20 that does not overlay or overlap the door frame 12, and which provides a line of sight through the window element 20. The unobstructed portion 27 in the depicted embodiment is see-through. The unobstructed portion 27 of the window element 20 is thus unobstructed by the door frame 12 between the proximal joint 26 delimiting the periphery of the window opening 22. For example, in the embodiment where the door 10A is a passenger door for the rotorcraft 100, the unobstructed portion 27 is the part of the window element 20 through which a passenger within the rotorcraft 100 may view the exterior, and through which someone outside the rotorcraft 100 may view into the cabin 180. The above description and examples do not preclude the unobstructed portion 27 of the window element 20 from having features which may hamper the passage of light such as regions of opacity, or sliding insets for the window element 20.

The visible or see-through portion of the window element 20 thus extends up to the edge (i.e. the proximal joint 26) of the window opening 22, thus helping to provide increased visibility in contrast to some conventional installations. The door frame 12 therefore helps to bring a transparency (e.g. the window element 20) right up to the edge of the door 10A, also known as the edge of part or "EOP". This may be considered to be aesthetically pleasing, and may obviate the need for additional sealing between the window element 20 and the door frame 12.

In the embodiment shown in FIG. 2, the overlap segment 25 overlays the outer wall 14 over the entire extent of the outer wall 14. The overlap segment 25 covers the outer wall 14 from the window end 14A to the fuselage end 14B. The window element 20 in FIG. 2 therefore overlays all of the outer wall 14 of the door frame 12. The inner window surface 24B along the overlap segment 25 is bonded to the outer wall 14. In the depicted embodiment, the inner window surface 24B along the overlap segment 25 is bonded to the outer wall 14 along the entire extent of the outer wall 14 from the window end 14A to the fuselage end 14B. In an alternate embodiment, the inner window surface 24B is bonded to the outer wall 14 along only part of the outer wall 14, or at one or more discrete locations along the outer wall 14. The faying surface between the door frame 12 and the window element 20 is thus used to bond the window element in place. The bonding of the window element 20 helps to reduce the need for, or the number of, mechanical fasteners needed to attach the window element 20 to the door frame 12. The window element 20 is fastened and/or bonded on the exterior surface of the door frame 12 around the window opening 22. The bonding of the window element 20 to the door frame 12 may also remove the need for a retainer to attach the window element 20, and consequently may thus reduce or eliminate the sealing required with a retainer.

The bond between the window element 20 and the door frame 12 may be created using different techniques, only some of which are now described. In one embodiment, the window element 20 is made from a transparent material, such as a thermoplastic, that is cured with a composite material of the door frame 12 during a curing process. In another embodiment, an adhesive is placed between the inner window surface 24B and the outer wall 12 to adhere them together. Other techniques are possible and within the scope of the present disclosure.

One possible embodiment for further securing the window element 20 to the door frame 12 with a fastener 30 is shown in FIG. 2. The second segment 16B of the inner wall 16 of the door frame 12 extends inwardly from the outer wall 14 at the fuselage end 14B to the common joint 16C. The second segment 16B of the inner wall 16 extends inwardly in a direction away from the fuselage 130 from the outer wall 14 at the fuselage end 14B to the common joint 16C. The second segment 16B has a distal section 17 adjacent to an extremity of the second segment 16B at the fuselage end 14B. The outer wall 14 at its fuselage end 14B covers or overlaps the distal section 17 of the second segment 16B, and they abut one another. Therefore, in the depicted embodiment, the outer wall 14 and the inner wall 16 overlap at the fuselage end 14B. The fastener 30 extends through the window element 20, the fuselage end 14B of the outer wall 14, and the distal section 17 of the second segment 16B to further secure the window element 20 to the door frame 12. In the depicted embodiment, the door frame 12 has only one fastener 30 to secure the window element 20 thereto. A length of the outer wall 14 between the window end 14A and the fastener 30 at the fuselage end 14B is free of another fastener 30. The window end 14A of the door frame 12 is therefore free of fasteners 30. The positioning of the fastener 30 and the fastener line toward the distal end of the door frame 12, as opposed to positioning the fastener 30 and the fastener line at the window end 14A, may help to increase visibility through the window element 20. In an alternate embodiment, the fastener 30 is positioned near a midpoint of the outer wall 14, between the window end 14A and the fuselage end 14B. In such an embodiment, the fastener 30 extends through the window element 20 and the outer wall 14 to further secure the window element 20 to the door frame 12. In such an embodiment, the window end 14A of the door frame 12 is therefore free of fasteners 30, which may help to increase visibility through the window element 20.

Still referring to FIG. 2, the peripheral window edge 25A defined by the overlap segment 25 of the window element 20 is aligned with a peripheral door frame joint 19 formed between the outer wall 14 and the inner wall 16 at the fuselage end 14B. The peripheral window edge 25A of the window element 20 therefore matches the end of the door frame 12 in the depicted embodiment. Matching the EOP of the window element 20 and the door frame 12 may remove the need for a retainer to secure the window element 20 to the door frame 12, and the sealing associated with such a retainer. The alignment of the peripheral window edge 25A and the peripheral door frame joint 19 may help the window element 20 and the door frame 12 to follow the same contour as the body of the fuselage 130.

The door frame 12 and window element 20 in the depicted embodiment provide a substantially seamless transition to the adjacent outer surface 132 of the fuselage 130 when the door 10A is in the closed position. The outer wall 14 is spaced inwardly (e.g. toward the interior of the fuselage 130) and recessed from the outer surface 132. The outer window surface 24A is substantially flush with the outer surface 132 of the fuselage 130 when the door 10A is in the closed position. The outer window surface 24A is therefore roughly level with the outer mold line (OML) of the fuselage 130, and is thus substantially flush with the adjacent aircraft structure. There is an insignificant (e.g. approximately zero) difference in the height of the outer window surface 24A and the outer surface 132. FIG. 2 shows a seal 40 between the outer surface 132 of the fuselage 130 and the door frame 12 and window element 20. The door 10A therefore helps to provide a sleek and substantially seamless assembly that follows the same contour as the body of the fuselage 130.

Still referring to FIG. 2, a finishing coating 50, such as black paint, covers the outer window surface 24A of the overlap segment 25. The finishing coating 50 covers the entirety of the overlap segment 25 in the depicted embodiment. In an alternate embodiment, the finishing coating 50 covers less than the entirety of the overlap segment 25. The unobstructed portion 27 of the window element 20 is free of the finishing coating 50, in contrast to some conventional joints where a finishing coat is present over some of the unobstructed segments of the window element. The finishing coat 50 is optional and in an alternate embodiment, the outer window surface 24A is free of the finishing coat 50. In such an embodiment, the overlap segment 25 is tinted, or the underlying bond or adhesive between the window element 20 and the door frame 12 is dark, making the finishing coat 50 unnecessary.

Figure 3:
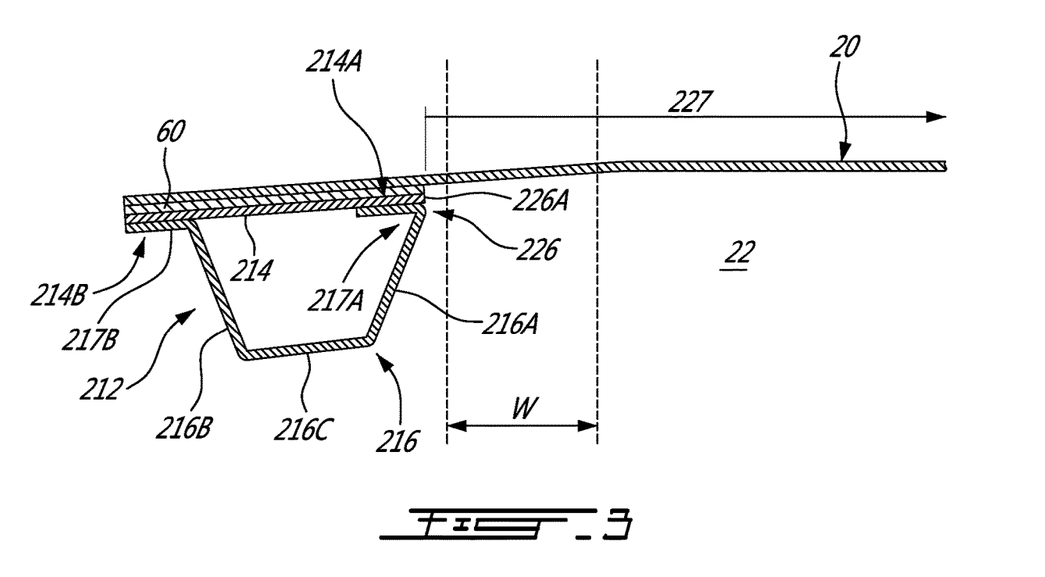
FIG. 3 is a cross-sectional view of a frame of a door, according to another embodiment of the present disclosure, and the window element.

Another embodiment of the door frame 212 is shown in cross-section in FIG. 3. In the description of FIG. 3 below, like reference numbers will denote like features. The outer and inner walls 214,216 of the door frame 212 meet and connect at both the window end 214A and the fuselage end 214B. The outer wall 214 overlaps the inner wall 216 at both the window and fuselage ends 214A,214B. At the window end 214A, the outer wall 214 overlaps a first distal segment 217A of the first segment 216A of the inner wall 216 to form the proximal joint 226 delimiting the window opening 22. At the fuselage end 214B, the outer wall 214 overlaps a second distal segment 217B of the second segment 216B of the inner wall 216. A third segment 216C of the inner wall 216 extends between the first and second segments 216A,216B. The window element 20 is bonded to the outer wall 214 with an adhesive 60.

In the embodiment of the door frame 212 shown in FIG. 3, the overlap of the outer wall 214 and the first distal segment 217A at the proximal joint 226 forms a corner 226A of the door frame 212 at the window end 214A. The corner 226A in the depicted embodiment is sharp or pointed. The first segment 216A of the inner wall 216 and the outer wall 214 are free of overlap at the corner 226A in the depicted embodiment. The inner wall 216 and the outer wall 214 are free of overlap at the corner 226A in the depicted embodiment. The door frame 212 is free of obstruction in an inward direction from the corner 226A (e.g. from the outer wall 214 toward the interior of the cabin 180). The window element 20 is free of obstruction in an inward direction from the corner 226A (e.g. from the window element 20 toward the interior of the cabin 180).

Figure 4:
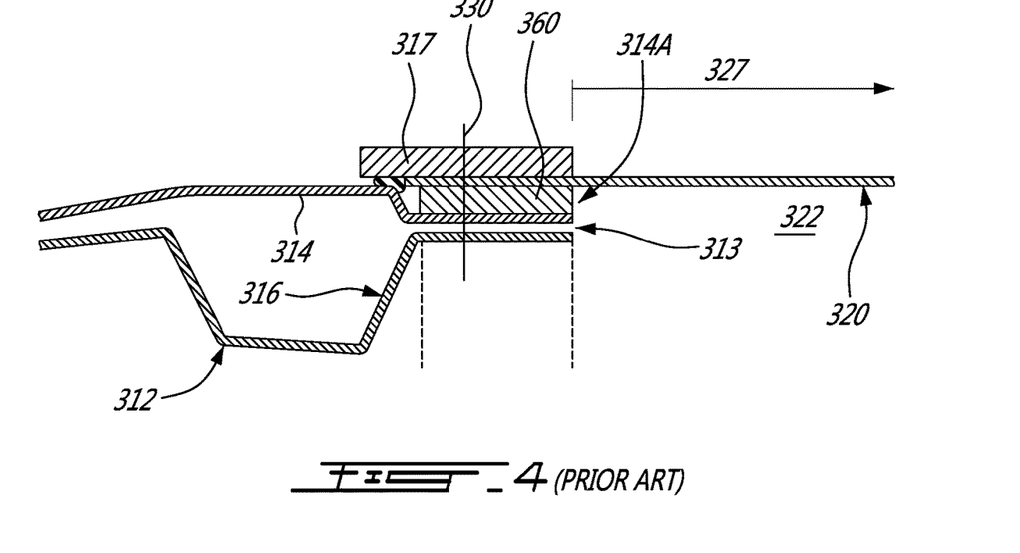
FIG. 4 is a cross-sectional view of a prior art frame of a door and a window element.

The lack of obstruction of the window element 20 at the corner 226A in FIG. 3 contributes to the increased visibility provided by the window element 20 for the door 10A disclosed herein. For contrast, a prior art door frame 312 is shown in FIG. 4. The door frame 312 in FIG. 4 has a flange 313 formed between the outer wall 314 and the inner wall 316 at the window end 314A of the door frame 312. The flange 313 extends from the door frame 312 toward the center of the window opening 322. The window element 320 is mounted along its periphery over the flange 313 of the door frame 312, and secured thereto with an adhesive 360 and a fastener 330. A retainer 317 is then added over the window element 320 to retain the window element 320 to the flange 313. The retainer 317 is not flush with the body of the adjacent fuselage, and is fastened using protruding fasteners which is not ideal for aerodynamic performance. The protruding flange 313 results in the unobstructed portion of the window element 320 being smaller than the unobstructed portion 227 of the door frame 212 in FIG. 3, by a width W. It can therefore be appreciated that the flange 313 of the prior art door frame 312 shown in FIG. 4 reduces the effective size of the window element 320, and thus reduces the field of view of the window element 320.

The door 10A and the door frames 12,212 disclosed herein allow for the possibility of window elements 20 covering almost all of the door 10A, because there is a small or no junction between the window element 20 and the door frame 12,212, and thus little or no need for a seal or trim member.

Referring to FIG. 2, there is also disclosed a method of manufacturing or assembling the windowed structure 10. The method includes providing the frame 12 as described above. The method includes attaching the window element 20 to the frame 12 to cover the window opening 22 such that a segment of the window element 20 (e.g. the overlap segment 25) overlays the outer wall 14 of the frame 12. A portion of the window element 20 (e.g. the unobstructed portion 27) is defined between the segment and is unobstructed between the proximal joint 26 of the frame 12.

Other embodiments of the door frame 12 are shown in cross-section in FIGS. 5A to 5D. Unless stated otherwise, like features will bear like reference numbers and the description above of said features applies mutatis mutandis to FIGS. 5A to 5D. FIGS. 5A to 5D include features described above and shown in other figures, even if these features are not expressly described with reference to FIGS. 5A to 5D.

Figure 5A:
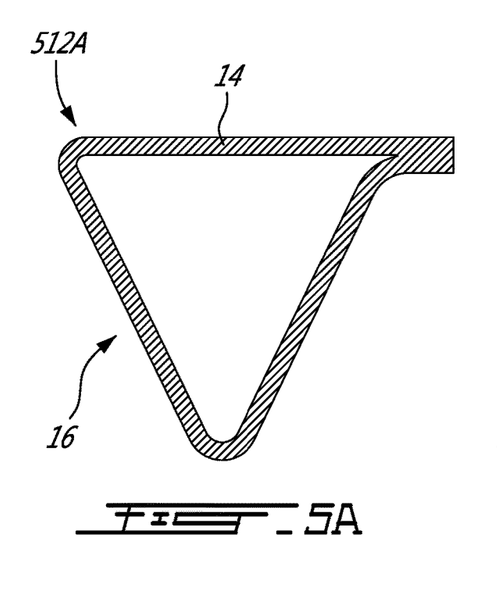
FIG. 5A is a cross-sectional view of a frame of the door according to another embodiment of the present disclosure.
Figure 5B:
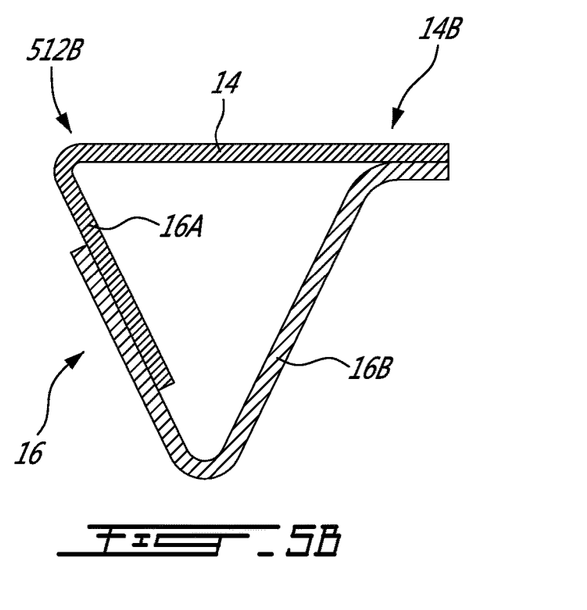
FIG. 5B is a cross-sectional view of a frame of the door according to another embodiment of the present disclosure.
Figure 5C:
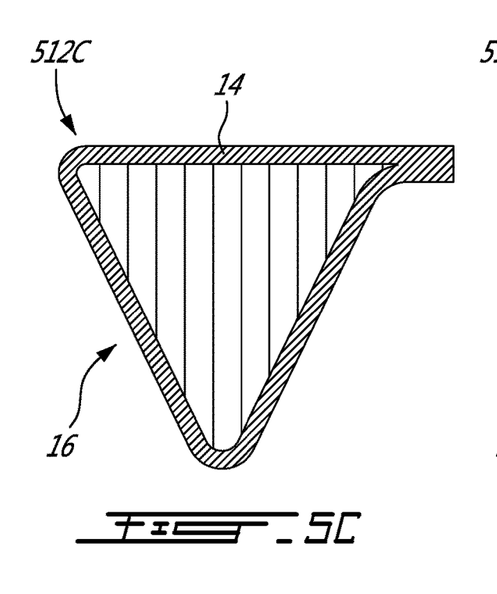
FIG. 5C is a cross-sectional view of a frame of the door according to another embodiment of the present disclosure.
Figure 5D:
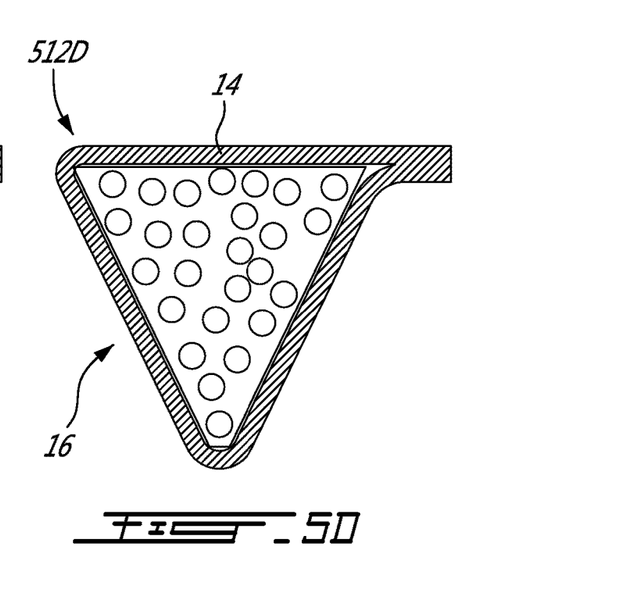
FIG. 5D is a cross-sectional view of a frame of the door according to another embodiment of the present disclosure.

In FIG. 5A, the inner wall 16 and the outer wall 14 delimit a cavity of the door frame 512A, such that the door frame 512A is hollow. The outer and inner walls 14,16 are integral with each other, such that the door frame 512A is a one-piece laminate. In FIG. 5B, the inner wall 16 and the outer wall 14 delimit a cavity of the door frame 512B, such that the door frame 512B is hollow. The first segment 16A of the inner wall 16 of the door frame 512B is partially overlapped by the second segment 16B, and the first and second segments 16A,16B are bonded together along their overlapping portions. The second segment 16B is also bonded to the outer wall 14 near the fuselage end 14B. In FIG. 5C, the cavity delimited by the inner wall 16 and the outer wall 14 is filled, such that the door frame 512C is not hollow. The cavity is filled with a sandwich composite material, such that the door frame 512C has a sandwich core. The outer and inner walls 14,16 are integral with each other, such that the door frame 512C is a one-piece laminate. In FIG. 5D, the cavity delimited by the inner wall 16 and the outer wall 14 is filled, such that the door frame 512D is not hollow. The cavity is filled with a foam composite material, such that the door frame 512D has a foam core. The outer and inner walls 14,16 are integral with each other, such that the door frame 512D is a one-piece laminate.

Other embodiments of the door frame 12 are shown in cross-section in FIGS. 6A to 6E. Unless stated otherwise, like features will bear like reference numbers and the description above of said features applies mutatis mutandis to FIGS. 6A to 6E. FIGS. 6A to 6E include features described above and shown in other figures, even if these features are not expressly described with reference to FIGS. 6A to 6E.

Figure 6A:
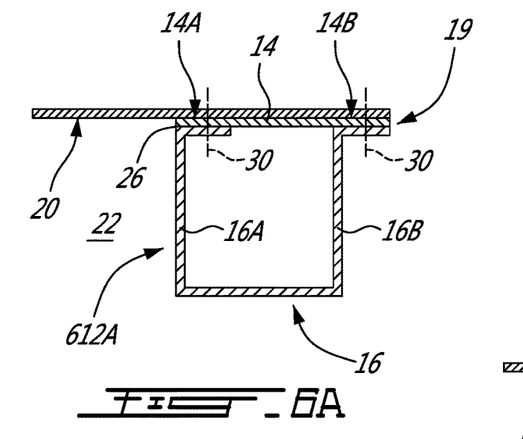
FIG. 6A is a cross-sectional view of a frame of the door according to another embodiment of the present disclosure.

In FIG. 6A, the first segment 16A of the inner wall 16 of the door frame 612A is bonded or fastened to the outer wall 14 at the window end 14A to form the proximal joint 26 delimiting the bounds of the window opening 22. The second segment 16B of the inner wall 16 is also bonded or fastened to the outer wall 14 at the fuselage end 14B to from the peripheral door frame joint 19. A fastener 30 may be provided at the fuselage end 14B to extend through the window element 20, the outer wall 14, and the second segment 16B of the inner wall 16 to further secure the window element 20 to the door frame 612A. Another fastener 30 may also be provided at the window end 14A to extend through the window element 20, the outer wall 14, and the first segment 16A of the inner wall 16 to further secure the window element 20 to the door frame 612A. The door frame 612A in the depicted embodiment has a rectangular cross-sectional shape.

Figure 6B:
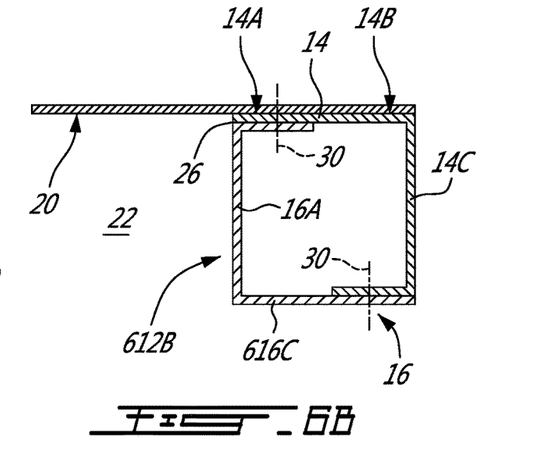
FIG. 6B is a cross-sectional view of a frame of the door according to another embodiment of the present disclosure.

In FIG. 6B, the first segment 16A of the inner wall 16 of the door frame 612B is partially overlapped by the outer wall 14 at the window end 14A, and are bonded or fastened together along their overlapping portions to form the proximal joint 26 delimiting the bounds of the window opening 22. The outer wall 14 has an inwardly-extending segment 14C at the fuselage end 14B which extends towards the interior of the fuselage. The inwardly-extending segment 14C is partially overlapped by a third segment 616C of the inner wall 16, and the inwardly-extending segment 14C and the third segment 616C are bonded or fastened together along their overlapping portions. A fastener 30 may be provided at the fuselage end 14B to extend through the overlapping portions of the inwardly-extending segment 14C and the third segment 616C. Another fastener 30 may also be provided at the window end 14A to extend through the window element 20, the outer wall 14, and the first segment 16A of the inner wall 16 to further secure the window element 20 to the door frame 612B. The door frame 612B in the depicted embodiment has a rectangular cross-sectional shape.

Figure 6C:
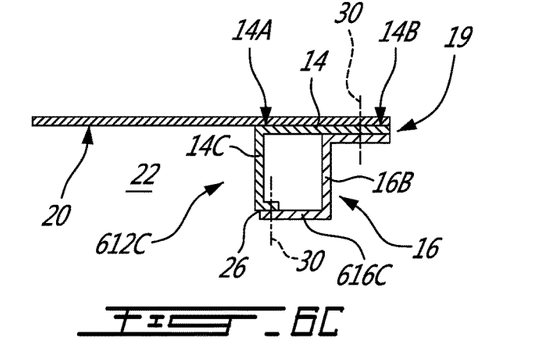
FIG. 6C is a cross-sectional view of a frame of the door according to another embodiment of the present disclosure.

In FIG. 6C, the outer wall 14 has an inwardly-extending segment 14C at the window end 14A which extends towards the interior of the fuselage. The inwardly-extending segment 14C is bonded or fastened to the third segment 616C of the inner wall 16 to form the proximal joint 26 delimiting the bounds of the window opening 22. In the depicted embodiment, the proximal joint 26 is spaced inwardly from the window element 20. The second segment 16B of the inner wall 16 is also bonded or fastened to the outer wall 14 at the fuselage end 14B to from the peripheral door frame joint 19. A fastener 30 may be provided at the fuselage end 14B to extend through the window element 20, the outer wall 14, and the second segment 16B of the inner wall 16 to further secure the window element 20 to the door frame 612C. Another fastener 30 may also be provided to extend through inwardly-extending segment 14C of the outer wall 14 and the third segment 616C of the inner wall 16. The door frame 612C in the depicted embodiment has a rectangular cross-sectional shape.

Figure 6D:
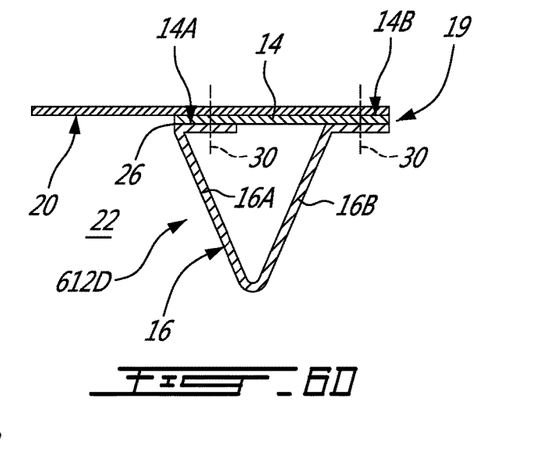
FIG. 6D is a cross-sectional view of a frame of the door according to another embodiment of the present disclosure.

In FIG. 6D, the first segment 16A of the inner wall 16 of the door frame 612D is bonded or fastened to the outer wall 14 at the window end 14A to form the proximal joint 26 delimiting the bounds of the window opening 22. The second segment 16B of the inner wall 16 is also bonded or fastened to the outer wall 14 at the fuselage end 14B to from the peripheral door frame joint 19. A fastener 30 may be provided at the fuselage end 14B to extend through the window element 20, the outer wall 14, and the second segment 16B of the inner wall 16 to further secure the window element 20 to the door frame 612D. Another fastener 30 may also be provided at the window end 14A to extend through the window element 20, the outer wall 14, and the first segment 16A of the inner wall 16 to further secure the window element 20 to the door frame 612D. The door frame 612D in the depicted embodiment has a triangular cross-sectional shape.

Figure 6E:
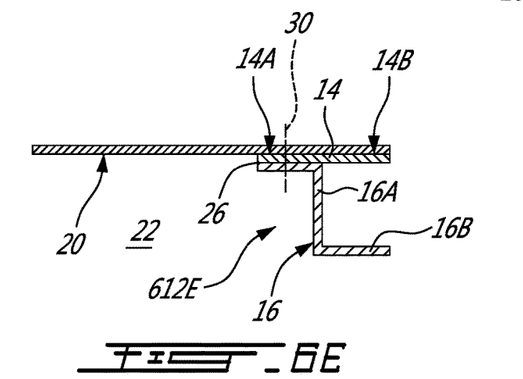
FIG. 6E is a cross-sectional view of a frame of the door according to another embodiment of the present disclosure.

In FIG. 6E, the first segment 16A of the inner wall 16 of the door frame 612E is bonded or fastened to the outer wall 14 at the window end 14A to form the proximal joint 26 delimiting the bounds of the window opening 22. The second segment 16B of the inner wall 16 is not bonded. A fastener 30 may be provided at the window end 14A to extend through the window element 20, the outer wall 14, and the first segment 16A of the inner wall 16 to further secure the window element 20 to the door frame 612E. The door frame 612E in the depicted embodiment has a Z cross-sectional shape. The door frame 612E in the depicted embodiment is open on one side adjacent to the fuselage end 14B. The door frames 612A, 612B, 612C, 612D are closed on all sides.

The above description is meant to be exemplary only, and one skilled in the art will recognize that changes may be made to the embodiments described without departing from the scope of the invention disclosed. For example, although described herein as being installed on a rotorcraft 100, the windowed structure 10 may be used on another type of vehicle. The window structure 10 may also be present on a stationary object, and thus, on something other than a vehicle. Still other modifications which fall within the scope of the present invention will be apparent to those skilled in the art, in light of a review of this disclosure, and such modifications are intended to fall within the appended claims.

The invention claimed is:

1. An aircraft, comprising
a fuselage defining an outer surface and an inner surface, the fuselage having a door opening extending therethrough and providing access to an interior of the fuselage; and
a door mounted to the fuselage about the door opening and displaceable between an open position and a closed position, the door having a door frame with an outer wall extending between a window end and a fuselage end, and an inner wall extending from the outer wall inwardly toward the interior of the fuselage, the inner wall connected to the outer wall at the window end to define a proximal joint of the door frame delimiting a window opening extending through the door, the door having a window element covering the window opening and defining an outer window surface and an inner window surface, the window element having an overlap segment overlaying the outer wall and being attached thereto, an unobstructed portion of the window element defined adjacent to the overlap segment and being unobstructed by the door frame at the proximal joint.

2. The aircraft as defined in claim 1, wherein the inner wall of the door frame has a first segment extending inwardly from the outer wall at the window end, the first segment intersecting the outer wall at a corner defining the proximal joint.

3. The aircraft as defined in claim 1, wherein the overlap segment overlays the outer wall to cover the outer wall from the window end to the fuselage end.

4. The aircraft as defined in claim 3, wherein the inner window surface of the overlap segment is bonded to the outer wall.

5. The aircraft as defined in claim 1, wherein upon the door being in the closed position, the outer wall is spaced inwardly from the outer surface of the fuselage, and the outer window surface is flush with the outer surface of the fuselage.

6. The aircraft as defined in claim 1, wherein the inner wall of the door frame has a second segment extending inwardly from the outer wall at the fuselage end, the second segment having a distal section being covered by the outer wall at the fuselage end, the door further comprising a fastener extending through the window element, the fuselage end of the outer wall and the distal section of the second segment.

7. The aircraft as defined in claim 6, wherein a length of the outer wall between the window end and the fastener at the fuselage end is free of another fastener.

8. The aircraft as defined in claim 6, wherein the distal section includes a distal section edge aligned with a peripheral edge of the window element and with a peripheral edge of the door frame.

9. The aircraft as defined in claim 1, wherein the overlap segment defines a peripheral window edge of the window element and the fuselage end of the outer wall defines a peripheral door frame joint of the door frame, the peripheral door frame joint and the peripheral window edge being aligned.

10. The aircraft as defined in claim 1, wherein a finishing coating covers the outer window surface of the overlap segment.

11. The aircraft as defined in claim 1, wherein the outer window surface of the overlap segment is free of a finishing coat and at least one of: the overlap segment is tinted, and an adhesive between the inner window surface and the outer wall is dark.

12. The aircraft as defined in claim 1, wherein the outer wall is an outermost wall of the door frame.

13. The aircraft as defined in claim 1, wherein the unobstructed portion of the window element is all of the window element except for the overlap segment.

14. The aircraft as defined in claim 1, wherein the outer wall is a single layer of composite material having a constant thickness between the window and fuselage ends.

15. A windowed structure, comprising:
a body having a frame with an outer wall extending between a first end and a second end, and an inner wall extending from the outer wall, the inner wall connected to the outer wall at the first end to define a proximal joint of the body delimiting a window opening extending through the body; and
a window element covering the window opening and defining an outer window surface and an inner window surface, the window element having an overlap segment overlaying the outer wall and being attached thereto, an unobstructed portion of the window element defined between the overlap segment and being unobstructed by the frame between the proximal joint.

16. The windowed structure as defined in claim 15, wherein the inner wall of the frame has a first segment extending from the outer wall at the first end, the first segment intersecting the outer wall at a corner defining the proximal joint.

17. The windowed structure as defined in claim 15, wherein the overlap segment overlays the outer wall to cover the outer wall from the first end to the second end.

18. The windowed structure as defined in claim 17, wherein the inner window surface of the overlap segment is bonded to the outer wall.

19. The windowed structure as defined in claim 15, wherein the inner wall of the frame has a second segment extending from the outer wall at the second end, the second segment having a distal section being covered by the outer wall at the second end, the door further comprising a fastener extending through the window element, the second end of the outer wall and the distal section of the second segment, a length of the outer wall between the first end and the fastener at the second end is free of another fastener.

20. The windowed structure as defined in claim 15, wherein the overlap segment defines a peripheral window edge of the window element and the second end of the outer wall defines a peripheral frame joint of the frame, the peripheral frame joint and the peripheral window edge being aligned.

* * * * *